2,965,668
PHOSPHOROHYDRAZIDOTHIOATES

Henry Tolkmith, Midland, Mich., assignor to The Dow Chemical Company, Midland, Mich., a corporation of Delaware No Drawing. Filed Oct. 28, 1959, Ser. No. 849,190

6 Claims. (Cl. 260—461)

The present invention is directed to phosphorohydrazidothioates corresponding to the formula

In this and succeeding formulae, each R represents lower alkoxy or di(lower alkyl)-amino, and R' represents a radical selected from the group consisting of

and

in which X represents lower alkanoyl or benzoyl, Y represents oxygen or sulfur and Z represents lower alkyl, lower alkenyl, cyclohexyl or phenyl. The expressions "lower alkyl," "lower alkanoyl" and "lower alkeny" are employed in the present specification and claims to refer to radicals containing from 1–5 carbon atoms, inclusive. These new compounds are liquid or crystalline solid materials which are somewhat soluble in many organic solvents and of low solubility in water. They are useful as intermediates for the preparation of more complex organic phosphorus derivatives. The compounds are also useful as parasiticides and herbicides and are adapted to be employed as active toxic constituents of compositions for the killing of plants and for the control of mite, insect and bacterial organisms such as flies, aphids and southern army worms.

The carbamoyl substituted phosphorohydrazidothioates may be prepared by reacting a phosphorohydrazidothioate corresponding with the formula

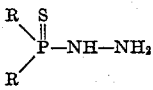

with an isocyanate having the formula $$Y=C=N-Z$$

wherein R, Y and Z are as previously defined. The reaction preferably is carried out in an inert organic liquid as reaction medium. Good results are obtained when employing substantially equimolecular proportions of the reagents. The reaction is somewhat exothermic and takes place smoothly at temperatures of from 0° to 80° C. with the formation of the desired product. The temperature may be controlled by regulating the rate of contacting the reactants and by external cooling. In carrying out the reaction, the reactants may be mixed together in any convenient manner. Upon completion of the reaction, any reaction medium may be removed by evaporation to obtain the desired product as a residue. This product may be purified by conventional means such as extraction with suitable solvents and recrystallization.

The acyl substituted phosphorohydrazidothioates of the present invention may be prepared by reacting a phosphorohydrazidothioate corresponding to the formula

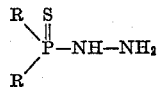

with an acyl halide of the formula

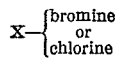

wherein R and X are as previously defined. The reaction is carried out in the presence of an alkaline reagent such as a tertiary amine and preferably in an inert organic liquid as reaction medium. Good results are obtained when one molecular proportion of the phosphorohydrazidothioate reagent is reacted with 1, 2 or 3 molecular proportions of the acyl halide and in a corresponding amount of the alkaline reagent depending upon whether it is desired to introduce 1, 2 or 3 acyl groups into the molecule. The reaction is somewhat exothermic and takes place smoothly at the temperature range of from 0° to 100° C. with the production of the desired product and hydrogen halide of reaction. This hydrogen halide appears in the reaction mixture as the halide of the alkaline reagent such as tertiary amine hydrogen halide. The temperature may be controlled by regulating the rate of contacting the reagents and by external cooling. In carrying out the reaction, the reactants may be mixed together in any convenient manner and in the presence of the alkaline reagent. Upon completion of the reaction, the reaction mixture may be washed with water to remove halide of reaction, and any reaction medium removed by evaporation to obtain the desired product as a residue. This product may be purified by conventional procedures such as recrystallization or extraction with suitable solvents.

The following examples merely illustrate the invention and are not to be construed as limiting.

*Example 1.—O,O-dimethyl 2-phenylcarbamoyl phosphorohydrazidothioate*

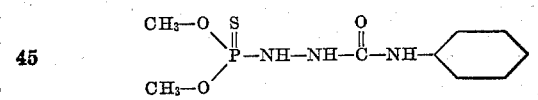

Phenyl isocyanate (48 grams; 0.4 mole) was dispersed in 300 milliliters of benzene and the resulting mixture added slowly portionwise to 63 grams (0.4 mole) of O,O-dimethyl phosphorohydrazidothioate dispersed in 300 milliliters of benzene. The addition was carried out at room temperature and over a period of 3 hours with stirring. During the addition, an O,O-dimethyl 2-phenylcarbamoyl phosphorohydrazidothioate product precipitated in the reaction mixture as a crystalline solid. Following the reaction, the product was separated by filtration and recrystallized from diethyl ether. The recrystallized product melted at 101°–102° C. and had nitrogen, phosphorus and sulfur contents of 14.8 percent, 11.84 percent and 11.79 percent, respectively, as compared to theoretical contents of 15.27 percent, 11.25 percent and 11.65 percent.

*Example 2.—O,O-diethyl 2-phenylcarbamoyl phosphorohydrazidothioate*

In a similar manner, 0.4 mole of phenyl isocyanate was reacted with 0.4 mole of O,O-diethyl phosphorohydrazidothioate. The conditions of reaction and methods of separation were all exactly as described in Example 1. As a result of these operations, there was obtained an O,O-diethyl 2-phenylcarbamoyl phosphorohydrazidothioate product melting at 145° C. and containing nitrogen, phosphorus and sulfur contents of 13.17 percent, 10.68 percent and 10.98 percent, respectively as compared to theoretical contents of 13.85 percent, 10.02 percent and 10.57 percent.

*Example 3.—O,O-dimethyl 2-allylthiocarbamoyl phosphorohydrazidothioate*

In a manner exactly as described in Example 1, 0.4 mole of allyl isothiocyanate was reacted with 0.4 mole of O,O-dimethyl phosphorohydrazidothioate. Following the reaction, an O,O-dimethyl 2-allylthiocarbamoyl phosphorohydrazidothioate product was separated from the reaction mixture by filtration and recrystallized from diethyl ether. The recrystallized product melted at 110°–111° C. and had nitrogen, phosphorus and sulfur contents of 16.61 percent, 12.47 percent and 25.1 percent, respectively, as compared to theoretical contents of 16.4 percent, 12.13 percent and 25.12 percent.

*Example 4.—O,O-diethyl 2-allylthiocarbamoyl phosphorohydrazidothioate*

Allyl isothiocyanate (40 grams; 0.4 mole) was dispersed in 500 milliliters of benzene and the resulting mixture added portionwise to 0.4 mole of O,O-diethyl phosphorohydrazidothioate dispersed in 400 milliliters of benzene. The addition was carried out with stirring at room temperature and over a period of 3 hours. Following the addition, the benzene was removed from the reaction mixture by evaporation and the residue recrystallized from diethyl ether to obtain an O,O-diethyl 2-allylthiocarbamoyl phosphorohydrazidothioate product as a crystalline solid melting at 114°–115° C. This product had nitrogen, phosphorus and sulfur contents of 14.67 percent, 11.0 percent and 22.4 percent, respectively, as compared to theoretical contents of 14.83 percent, 10.93 percent and 22.63 percent.

*Example 5.—O,O-dimethyl 2-phenylthiocarbamoyl phosphorohydrazidothioate*

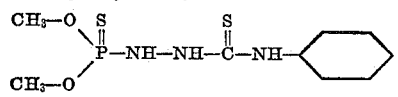

In a similar manner, 54 grams (0.4 mole) of phenyl isothiocyanate was reacted with 0.4 mole of O,O-dimethyl phosphorohydrazidothioate. The conditions of reaction and methods of separation were all as described in Example 4 with an O,O-dimethyl 2-phenylthiocarbamoyl phosphorohydrazidothioate product being obtained as a crystalline solid melting at 104°–105° C. This product contained nitrogen, phosphorus and sulfur contents of 14.17 percent, 10.67 percent and 22.4 percent, respectively, as compared to theoretical contents of 14.42 percent, 10.63 percent and 22.01 percent.

*Example 6.—O,O-diethyl 2-phenylthiocarbamoyl phosphorohydrazidothioate*

In a manner exactly as described in Example 4, 0.4 mole of phenyl isothiocyanate was reacted with 0.4 mole of O,O-diethyl phosphorohydrazidothioate to obtain an O,O-diethyl 2-phenylthiocarbamoyl phosphorohydrazidothioate product as a crystalline solid melting at 121°–122° C. This product had nitrogen, phosphorus and sulfur contents of 13.09 percent, 9.94 percent and 20.83 percent, respectively, as compared to theoretical contents of 13.16 percent, 9.7 percent and 20.08 percent.

*Example 7.—O,O-diethyl 2-cyclohexylthiocarbamoyl phosphorohydrazidothioate*

Cyclohexyl isothiocyanate (50 grams; 0.4 mole) was reacted with 0.4 mole of O,O-diethyl phosphorohydrazidothioate as described in Example 4. The conditions of reactions and methods of separation were as described in the example with the desired product being recrystallized from cyclohexane. As a result of these operations, an O,O-diethyl 2-cyclohexylthiocarbamoyl phosphorohydrazidothioate product was obtained as a crystalline solid melting at 82°–84° C., and having nitrogen, phosphorus and sulfur contents of 12.9 percent, 10.39 percent and 11.09 percent, respectively, as compared to theoretical contents of 13.58 percent, 10.01 percent and 10.37 percent.

*Example 8.—N,N,N',N'-tetramethyl 2-phenylthiocarbamoyl phosphorohydrazidothioate*

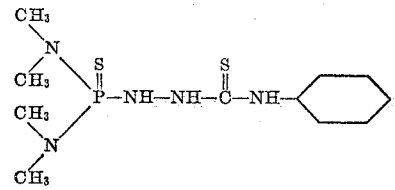

Phenyl isothiocyanate (0.16 mole) was dispersed in 200 milliliters of benzene and the resulting mixture added portionwise to 29 grams (0.16 mole) of N,N,N',N'-tetramethylphosphorohydrazidothioate dispersed in 200 milliliters of benzene. The addition was carried out at room temperature and over a period of 3 hours with stirring. During the addition, an N,N,N',N'-tetramethyl 2-phenylthiocarbamoyl phosphorohydrazidothioate product precipitated in the reaction mixture as a crystalline solid. Following the reaction, this product was separated by filtration and recrystallized from diethyl ether. The recrystallized product melted at 134°–134.5° C., and contained nitrogen, phosphorus and sulfur contents of 21.69 percent, 9.92 percent and 20.57 percent, respectively, as compared to theoretical contents of 22.07 percent, 9.76 percent and 20.2 percent.

*Example 9.—O,O-dimethyl 2-acetyl phosphorohydrazidothioate*

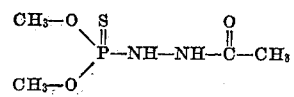

Acetyl chloride (32 grams; 0.41 mole) was dispersed in 300 milliliters of benzene and the resulting mixture added portionwise to a mixture comprising 0.4 mole of O,O-dimethyl phosphorohydrazidothioate and 0.41 mole of triethylamine dispersed in 500 milliliters of benzene. The addition was carried out at room temperature and over a period of 3 hours with stirring. During the addition, a solid material precipitated in the reaction mixture. Following the reaction, the solid was separated by filtration and successively extracted with benzene and diethyl ether. The benzene and ether extracts and the filtrate were then combined, and the solvent removed by evaporation to obtain an O,O-dimethyl 2-actyl phosphorohydrazidothioate product as a crystalline residue. This product was recrystallized from cyclohexane and found to melt at 96°–97° C., and contain nitrogen and sulfur contents of 13.65 percent and 16.48 percent, respectively, as compared to theoretical contents of 14.14 percent and 16.18 percent.

*Example 10.—O,O-dimethyl 2-benzoyl phosphorohydrazidothioate*

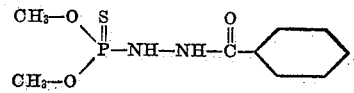

Benzoyl chloride (56 grams; 0.4 mole) was dispersed in 300 milliliters of benzene and the resulting product added portionwise to a mixture containing 0.4 mole of O,O-dimethyl phosphorohydrazidothioate and 0.41 mole of triethyl amine dispersed in 500 milliliters of benzene. The conditions of reaction and methods of separation were all as described in Example 9, with an O,O-dimethyl 2-benzoyl phosphorohydrazidothioate product being obtained as a crystalline solid having a melting point of 84°–85° C. This product had nitrogen, phosphorus and sulfur contents of 10.66 percent, 11.97 percent and 12.28 percent, respectively, as compared to theoretical contents of 10.77 percent, 11.9 percent and 12.32 percent.

*Example 11.—O,O-diethyl 2-acetyl phosphorohydrazidothioate*

Acetyl chloride (0.4 mole) was reacted with 0.4 mole of O,O-diethyl phosphorohydrazidothioate in the presence of 0.41 mole of triethyl amine exactly as described in Example 9. As a result of these operations, there was obtained an O,O-diethyl 2-acetyl phosphorohydrazidothioate product melting at 75°–76° C. and containing nitrogen, phosphorus and sulfur contents of 11.88 percent, 14.19 percent and 14.51 percent, respectively, as compared to theoretical contents of 12.38 percent, 13.69 percent and 14.17 percent.

*Example 12.—O,O-diethyl 2-benzoyl phosphorohydrazidothioate*

Benzoyl chloride (0.4 mole) was reacted with 0.4 mole of O,O-diethyl phosphorohydrazidothioate in the presence of 0.41 mole of triethyl amine as described in Example 10. The conditions of reaction and methods of separation were all as therein set forth with an O,O-diethyl 2-benzoyl phosphorohydrazidothioate product being obtained as a crystalline solid melting at 102°–103° C. This product had nitrogen, phosphorus and sulfur contents of 9.97 percent, 11.22 percent and 11.44 percent, respectively, as compared to theoretical contents of 9.72 percent, 10.74 percent and 11.12 percent.

*Example 13.—O,O-diethyl 2,2-diacetyl phosphorohydrazidothioate*

Acetyl chloride (47 grams; 0.6 mole) was dispersed in 700 milliliters of benzene and the resulting product added portionwise to a mixture consisting of 0.3 mole of O,O-diethyl phosphorohydrazidothioate and 0.65 mole of triethylamine dispersed in 300 milliliters of benzene. The addition was carried out over a period of 3 hours and at room temperature with stirring. Upon completion of the reaction, the reaction mixture was filtered and the solvent removed from the filtrate by evaporation. As a result of these operations, there was obtained an O,O-diethyl 2,2-diacetyl phosphorohydrazidothioate product as a liquid material having nitrogen, phosphorus and sulfur contents of 10.03 percent, 11.04 percent and 11.39 percent, respectively, as compared to theoretical contents of 10.44 percent, 11.55 percent and 11.95 percent. This product had a refractive index $n/D$ of 1.4868 at 25° C.

*Example 14.—O,O-diethyl triacetyl phosphorohydrazidothioate*

Acetyl chloride (94 grams; 1.2 moles) was dispersed in 800 milliliters of benzene and the resulting product added portionwise with stirring to a mixture consisting of 0.4 mole of O,O-diethyl phosphorohydrazidothioate and 0.4 mole of triethyl amine dispersed in 500 milliliters of benzene. The addition was carried out at room temperature and over a period of about 3 hours. Upon completion of the reaction, the reaction mixture was filtered, the solvent removed from the filtrate by evaporation and the residue recrystallized from diethyl ether. As a result of these operations, there was obtained an O,O-diethyl triacetyl phosphorohydrazidothioate product as a crystalline solid melting at 78°–80° C. and having nitrogen, phosphorus and sulfur contents of 9.06 percent, 10.41 percent and 10.71 percent, respectively, as compared to theoretical contents of 9.03 percent, 9.98 percent and 10.34 percent.

*Example 15.—O,O-dimethyl triacetyl phosphorohydrazidothioate*

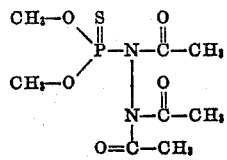

In a similar manner, 1.2 moles of acetyl chloride was reacted with 0.4 mole of O,O-dimethyl phosphorohydrazidothioate in the presence of 1.2 moles of triethyl amine exactly as described in Example 14. Upon completion of the reaction, the reaction mixture was processed as set forth therein to obtain an O,O-dimethyl triacetyl phosphorohydrazidothioate product as a crystalline solid melting at 82°–84° C., and containing nitrogen, phosphorus and sulfur contents of 9.9 percent, 10.86 percent and 11.37 percent, respectively, as compared to theoretical contents of 9.93 percent, 10.97 percent and 11.36 percent.

In a similar manner other compounds of the present invention may be prepared as follows:

O-amyl O-methyl 2-methallylcarbamoyl phosphorohydrazidothioate by reacting methallyl isocyanate with O-amyl O-methyl phosphorohydrazidothioate.

N,N-diethyl N',N'-diamyl 2-methylcarbamoyl phosphorohydrazidothioate by reacting methyl isocyanate with N,N-methyl N',N'-diamyl phosphorohydrazidothioate.

N-methyl N-ethyl N'-propyl N'-butyl 2-butylthiocarbamoyl phosphorohydrazidothioate by reacting butyl isothiocarbamate with N-methyl N-ethyl N'-propyl N'-butyl phosphorohydrazidothioate.

O,O-dibutyl 2-amylcarbamoyl phosphorohydrazidothioate by reacting amyl isocyanate with O,O-dibutyl phosphorohydrazidothioate.

O-methyl O-ethyl 2-buten-2-ylcarbamoyl phosphorohydrazidothioate by reacting buten-2-yl isocyanate with O-methyl O-ethyl phosphorohydrazidothioate.

N,N,N',N'-tetraethyl 2-propenylcarbamoyl phosphorohydrazidothioate by reacting 2-propenyl isocyanate with N,N,N',N'-tetraethyl phosphorohydrazidothioate.

N,N,N',N'-tetramethyl 2-cyclohexylcarbamoyl phosphorohydrazidothioate by reacting cyclohexyl isocyanate with N,N,N',N'-tetramethyl phosphorohydrazidothioate.

N,N,N',N'-tetramethyl 2-valeryl phosphorohydrazidothioate by reacting valeryl bromide with N,N,N',N'-tetramethyl phosphorohydrazidothioate in the presence of tributylamine.

N,N-dimethyl N',N'-diethyl 2-propionyl phosphorohydrazidothioate by reacting propionyl chloride with N,N-dimethyl N',N'-diethyl phosphorohydrazidothioate in the presence of triethylamine.

O-butyl O-ethyl 2-butyryl phosphorohydrazidothioate by reacting butyryl bromide with O-butyl O-ethyl phosphorohydrazidothioate in the presence of pyridine.

N,N,N',N' - tetraethyl 2-benzoyl phosphorohydrazidothioate by reacting benzoyl chloride with N,N,N',N'-tetramethyl phosphorohydrazidothioate in the presence of triethyl amine.

The new compounds of the present invention are effective as herbicides and parasiticides and are adapted to be employed for the control of many noxious weeds and agricultural pests. For such use, the products may be dispersed on an inert finely divided solid and employed as dusts. Also, such mixtures may be dispersed in water with the aid of a surface active agent, and the resulting aqueous suspensions employed as sprays. In other procedures, the products may be employed as constituents of oil-in-water emulsions or water dispersions with or without the addition of surface active dispersing agents. In representative operations, 100 percent controls of mites are obtained with aqueous compositions containing 500 parts by weight of O,O-diethyl 2-allylthiocarbamoyl phosphorohydrazidothioate, per million parts by weight of ultimate composition. In other operations, 100 percent kills of canary grass are obtained with aqueous compositions containing 100 parts by weight of O,O-diethyl-2-cyclohexylthiocarbamoyl phosphorohydrazidothioate per million parts by weight of ultimate mixture.

The O,O-di(lower alkyl) phosphorohydrazidothioates and N,N,N',N'-tetra(lower alkyl) phosphorohydrazidothioates employed as starting materials as herein described may be prepared in known methods by reacting hydrazine hydrate with a suitable O,O-di(lower alkyl) phosphorochloridothioate or N,N,N',N'-tetra (lower alkyl) phosphorohydrazidothioate in the presence of an organic liquid as reaction medium. The reaction takes place smoothly at temperatures of from 0° to 50° C. with the production of the desired product and hydrazine hydrochloride of reaction. Upon completion of the reaction, the desired product may be separated by conventional methods. The isocyanates and isothiocyanates as employed herein may be prepared in known methods by reacting a suitable amine with phosgene ($COCl_2$) and thiophosgene ($CSCl_2$), respectively.

I claim:

1. The phosphorohydrazidothioates corresponding to the formula

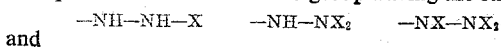

wherein each R represents a member of the group consisting of lower alkoxy and di(lower alkyl)-amino and R' represents a member of the group having the structures

—NH—NH—X    —NH—NX$_2$    —NX—NX$_2$ and

in which X is selected from the group consisting of lower alkanoyl and benzoyl, Y is selected from the group consisting of oxygen and sulfur and Z is selected from the group consisting of lower alkyl, lower alkenyl, cyclohexyl and phenyl.

2. O,O-dimethyl 2-allylthiocarbamoyl phosphorohydrazidothioate.

3. O,O-diethyl 2-cyclohexylthiocarbamoyl phosphorohydrazidothioate.

4. O,O-diethyl 2-allylthiocarbamoyl phosphorohydrazidothioate.

5. O,O-diethyl 2-acetyl phosphorohydrazidothioate.

6. O,O-dimethyl 2-phenylcarbamoyl phosphorohydrazidothioate.

No references cited.